April 30, 1968         P. E. BESSIERE         3,381,153
FOUCAULT CURRENT BRAKING DEVICES
Filed Dec. 8, 1964                                2 Sheets-Sheet 1
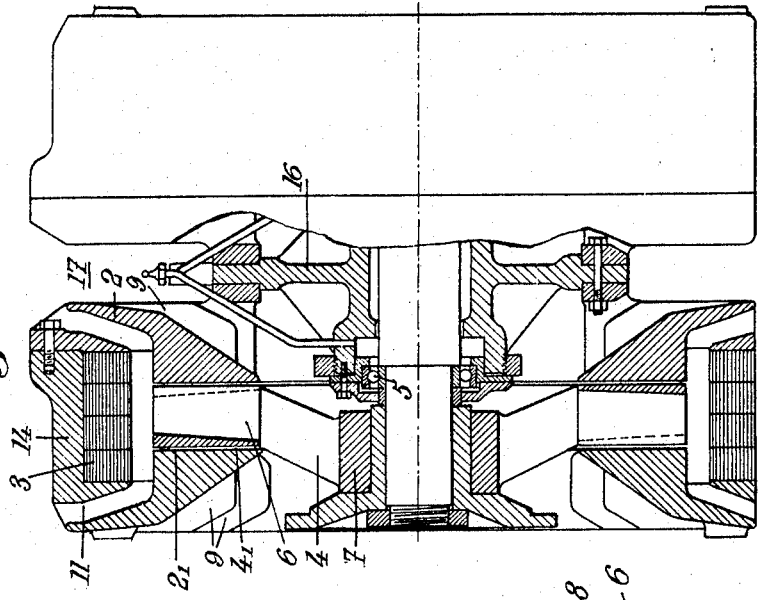
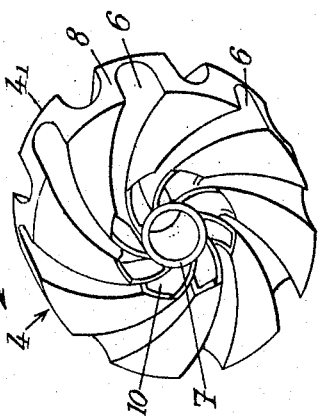
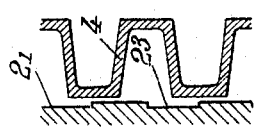
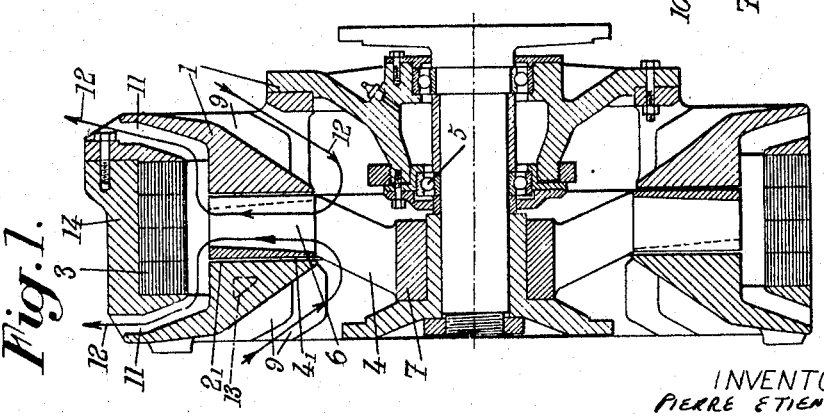
INVENTOR
PIERRE ETIENNE BESSIERE
BY Bailey, Stephens &
Huettig
ATTORNEYS April 30, 1968 P. E. BESSIERE 3,381,153
FOUCAULT CURRENT BRAKING DEVICES
Filed Dec. 8, 1964 2 Sheets-Sheet 2
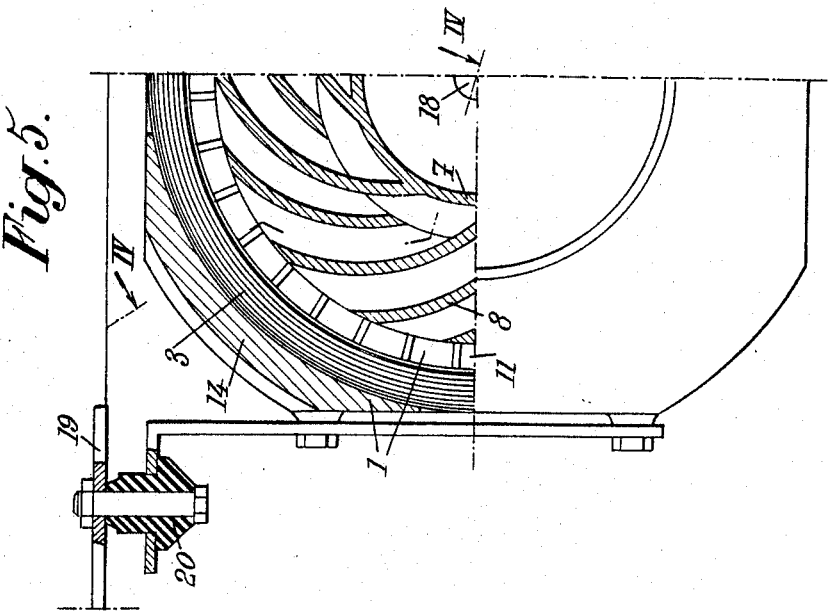
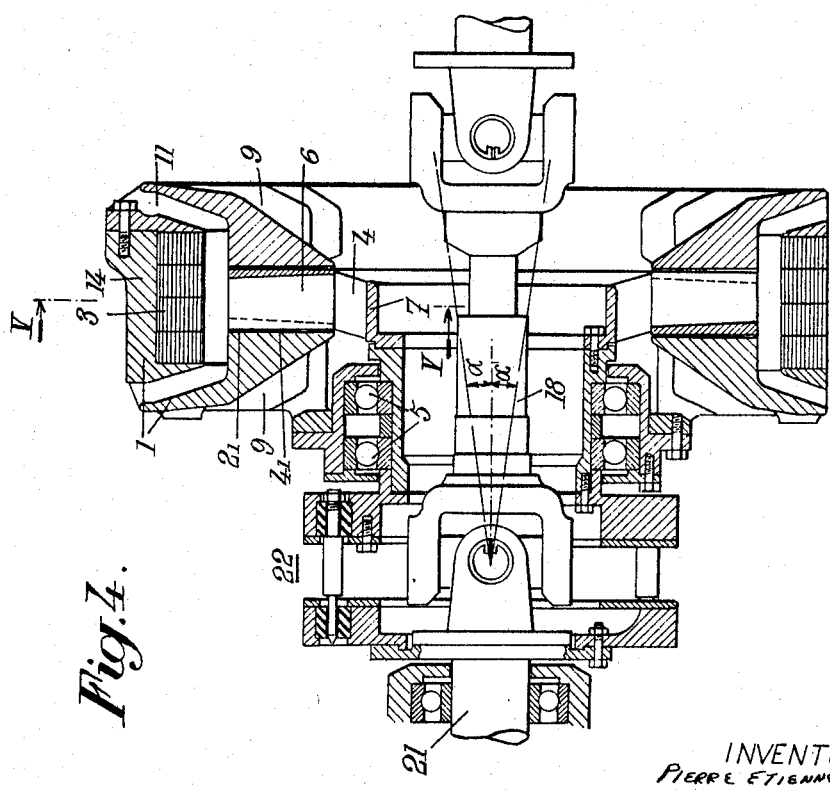
INVENTOR
PIERRE ETIENNE BESSIERE
BY Bailey, Stephen E. Kucthig
ATTORNEYS United States Patent Office 3,381,153
Patented Apr. 30, 1968

3,381,153
FOUCAULT CURRENT BRAKING DEVICES
Pierre Etienne Bessiere, Golf de Saint-Nom-la-Breteche, France, assignor to Societe Labavia, Saint-Ouen, Seine-St.-Denis, France, a society of France
Filed Dec. 8, 1964, Ser. No. 416,725
Claims priority, application France, Dec. 19, 1963, 957,847
8 Claims. (Cl. 310—93)

ABSTRACT OF THE DISCLOSURE

The Foucault current braking device comprises a stator and a rotor disc. The stator comprises a magnetic member having two annular areas parallel to each other and disposed opposite each other along a common axis; the stator further comprises an annular inductor winding housed in this member coaxially with said areas. The rotor disc is made of a magnetic material and is journalled in the stator about said axis. The rotor disc has two annular areas centered on said axis and located adjacent and close to the two stator annular areas respectively. At least one of the rotor disc annular areas is provided with a plurality of grooves extending transversely to the circumference of the disc annular area, the depth of said grooves in the direction of said axis being smaller than the thickness of the disc.

---

The present invention relates to Foucault current slowing down devices, such devices being intended to exert, when so desired, a braking torque on a rotary shaft such as the transmission shaft of a vehicle or that of a lifting or sounding apparatus.

The invention is more especially concerned with slowing down devices of the homopolar type, that is to say in which a single stationary inductor winding acts upon a single magnetic circuit in which the flux circulates always in the same direction. Of course such a magnetic circuit may be completed by at least one other single magnetic circuit of the same type, formed either by the same winding or by another winding in another portion of the slowing down device, in such manner that the braking torques exerted on the shaft of the slowing down device respectively by said magnetic circuits are added to each other. The slowing down devices of the homopolar type comprise, on the one hand a stator consisting essentially of a magnetic mass including two preferably flat annular surfaces, parallel and disposed axially opposite each other, and of an annular inductor winding housed in said mass and capable of creating a magnetic flux therethrough from one of said surfaces toward the other, and, on the other hand, a rotor adapted to rotate about the axis of revolution of said surfaces and including two discontinuous surfaces magnetically connected together and each adapted to pass, when the rotor is rotating, opposite and close to one of the above mentioned surfaces of the stator.

The chief object of the present invention is to provide a device of this type which is better adapted to meet the requirements of practice than those known up to this time, in particular concerning cooling, low inertia of the rotors and mechanical strength of said rotor.

According to the present invention the rotor consists of a disc at least one of the faces of which is provided with radial or substantially radial grooves, the axial depth of these grooves being smaller than the thickness of the disc, the thickness of the wall which separates two consecutive radial grooves being preferably just sufficient to permit the magnetic flux that has entered axially into the disc through the portion of one of the faces thereof existing between two consecutive grooves to be wholly transmitted toward the other face through the material between said two grooves. Preferably, said grooves are preferably inclined with respect to the radial directions of the disc toward the rear with respect to the direction of rotation thereof and advantageously curved toward the rear with respect to said direction of rotation and the two faces of the disc being preferably provided with identical grooves, but with a relative angular offsetting equal to one-half of the angular distance between two consecutive grooves of one face, whereby the cylindrical peripheral surface of the disc has a zigzag shape.

Preferred embodiments of the present invention will be hereinafter described with reference to the appended drawings, given merely by way of example, and in which:

FIG. 1 is an axial sectional view of a Foucault current slowing down device made according to a first embodiment of my invention;

FIG. 2 is a perspective view of the rotor of said device;

FIG. 3 is an axial sectional view of a double slowing down device made according to the present invention;

FIG. 4 is an axial sectional view on the line IV—IV of FIG. 5, of another embodiment of the present invention;

FIG. 5 is an end view of said device, seen from the left of FIG. 4, partly in section on the line V—V of FIG. 4;

FIG. 6 is a diagrammatic illustration of a detail of another modification.

The device according to this invention comprises a stator 1, comprising a magnetic part 2 and an inductor coil 3, having an axis of symmetry which is that of the device, and a rotor 4.

Magnetic part 2 comprises two flanges forming between them an outward gutter, in which is located inductor coil 3, and an annular passage limited by flat annular walls $2_1$.

Rotor 4, journalled on bearings 5 carried by stator 1, has its lateral walls $4_1$ located in two surfaces of revolution parallel and close to the stator walls $2_1$.

The side walls of rotor 4 adjoining stator walls $2_1$ are not continuous, but consist of a multiplicity of flux flow areas, those on one side of rotor 4 communicating with those on the other side through the mass of said rotor. Thus the magnetic flux tending to flow out from one of the walls $2_1$ of the stator into rotor 4 can do so only when an adjoining area of said rotor passes opposite it. Therefore, this flux rotates together with the rotor so that the flux at any point of one stator wall $2_1$ varies alternately between zero and a maximum value. In a likewise manner, any point of the other stator wall $2_1$ receives magnetic flux from rotor 4 only when an adjoining area of the adjacent wall of the rotor passes opposite said point but does not receive magnetic flux when a hollow between said areas passes opposite said point.

Consequently the magnetic flux created in the stator walls $2_1$ is a varying one and the braking induced currents are produced in said stator walls. On the contrary, in the rotor, neither the intensity nor the direction of the flux varies, so that no induced current is created therein. Accordingly the temperature in the rotor is always relatively low, which greatly facilitates its cooling.

Up to now, the discontinuous areas of the side walls of rotor 4 consisted of the transverse faces of solid magnetic teeth fixed radially to a non-magnetic central hub. Such a construction involved many drawbacks, in particular concerning the difficulty of cooling down the active faces of the stator, the high inertia of the rotor and the tendency of the teeth to fly off from the hub under the effect of the centrifugal force.

In order to obviate these drawbacks, according to the present invention, the rotor consists of a single block disc of a magnetic material provided with a plurality of grooves 6 extending from the central part of the disc to its periphery, either rectilinear or, preferably, spiral shaped, of a depth smaller than the thickness of the disc. Preferably, said grooves 6 extend from the hub 7 of the rotor to the periphery thereof, as shown by FIG. 2.

Such a structure is well adapted to resist the action of the centrifugal force, which exerts bending stresses instead of pulling stresses, especially when the grooves are inclined and curved toward the rear as shown by FIG. 2 where arrow 15 indicates the direction of rotation.

The grooves formed in one of the faces of the rotor are identical to those formed in the other face but angularly offset with respect to them by one half of the angular interval between two consecutive grooves of one face. Thus the periphery of the disc is zigzag-shaped.

The inner profile of every groove 6 is a U having a rounded base, for reasons of mechanical resistance and simplicity of manufacture, the disc being advantageously made by molding or stamping. This profile may or may not vary along the groove, in form and/or in size.

The partitions 8 (FIG. 2) between grooves 6 must be sufficiently thick to be able to transmit from one face of the disc to the other face the whole of the magnetic flux entering through said first face, and also for ensuring a proper mechanical resistance of this disc, which is to be run at high speeds and/or accelerations. Advantageously said partitions 8 are chosen of a thickness just sufficient for complying with these conditions so as to reduce to a minimum the weight of the disc and therefore its inertia. These partitions 8 act as fan blades, ensuring circulation of a cooling fluid (air or another fluid) along said partitions and also directly along the fixed hot surfaces $2_1$. This circulation ensures on intensive cooling of said surfaces $2_1$, which constitutes an important advantage of the invention.

Before entering grooves 6, the cooling fluid is sucked in along guide blades 9 belonging to the stator, then through intervals 10 which extend, in the axial direction, through out the disc along the periphery of the hub 7 thereof. This cooling fluid is then evacuated through outflow passages 11 provided in stator 2. This path of the cooling fluid has been diagrammatically illustrated by the arrows 12 of FIG. 1.

It should be noted that, after flowing along guide blades 9 and before entering spaces 10, the cooling fluid circulates in closed proximity to bearings 5, and cools them down, which also constitutes an important advantage.

Of course the above described cooling fluid circulation may be improved by any other circulation of another cooling fluid (water or the like through suitable channels such as those shown at 13 in FIG. 1).

As clearly visible in FIGS. 1, 2 and 5, only every second partition 8 extends as far as hub 7 to secure the disc to said hub, the other partitions stopping short of the active annular portion of the disc, which reduces the weight of the wheel and improves the air circulation therethrough.

Instead of being continuous, the portion of magnetic circiut 2, disposed on the external side of winding 3 may consist of several magnetic portions 14 separated from one another, so as to reduce the radial dimensions of the stator between these portions 14, as clearly visible on FIG. 5. In this figure the number of said bridging portion 14 is equal to four, disposed at angular intervals of 90° from one another, whereby the external volume of the whole has a substantially parallelepipedal shape and has its vertical and horizontal dimensions reduced. It can therefore be easily housed and fixed under a vehicle, for instance between two Cardan joints connected respectively to the gear box and to the rear axle of this vehicle.

As for coil 3 it may be of conventional construction, but advantageously it consists of a succession of rings of an aluminum strip disposed superficially side by side, such a construction permitting a minimum weight and an optimum utilisation of the available space, the ratio of the cross section of the insulated conductor to that of the bare conductor being nearly equal to one.

Multiple slowing down devices based on the above mentioned principles and having the advantage of an active air circulation along their delicate and hot elements can be made as follows.

The construction of FIG. 3 relates to a double slowing down device. The whole of the two rotors of these devices is journalled in only two bearings 5, themselves carried by a central stator support 16. The cooling fluid is sucked in by said rotors through an annular slot 17 provided between the two magnetic structures 2, said fluid thus cooling bearings 5 before entering the rotors.

It should also be noted that the above mentioned features permit of making the slowing down device in the form of a ring of great inner diameter, through which can pass a transmission shaft 18 (FIGS. 4 and 5) capable of great angular displacements (as illustrated by the angles $\alpha$ of FIG. 4). In this case, the stator 1 of the slowing down device is supported by the frame 19 of the vehicle, for instance by means of resilient shock absorbers 20 (FIG. 5), and rotor 4 is itself coupled with a portion of the transmission shaft (such as the output shaft 21 of the gear box) through a flexible system 22 as described in French Patent No. 1,386,434, patented Dec. 14, 1964; for "Improvements Brought to Foucault Current Slowing Down Devices."

The device according to the present invention may also have its rotor mounted upon a member rigid either with the output shaft of the gear box, or with the input shaft of the vehicle driving axle, the stator being then rigid with said gear box or with the casing of said driving axle and the rotor being centered in the stator through the bearings of this box or of this casing.

Slowing down devices according to the present invention have the following advantages:

Excellent evacuation of the heat produced by the Foucault currents, due to the fact that a cooling fluid driven by the rotor acting as a fan passes directly along the hot surfaces when said currents are created;

Good cooling of the rotor bearings;

Low inertia of the rotor and good mechanical resistance thereof which permits high speeds of rotation and/or high accelerations of this rotor;

High intensity of the induced currents that are formed, the variations of magnetic flux created in the stator taking place as well in radial directions as in circumferential directions;

Facility of modifying a given slowing down device in order to give it new characteristics, since it suffices to replace a rotor disc by another one;

Low heating of the rotor since no Foucault current circulates therein;

Mechanical protection of the rotor due to the fact that it is surrounded by the stator;

Possibility of making the slowing down device in the form of a ring of great inner diameter;

Possibility of giving the system a substantially parallelepipedal external shape.

Of course the device according to the present invention may have different modifications, in particular: those where radial slots would be provided in the stator areas contiguous to active walls $2_1$ so as to decrease the armature reaction flux that circulates therein concentrically to the axis without passing through the air gaps;

Those where said active faces $2_1$, instead of being flat, will be provided with notches, grooves or other recesses 23 (FIG. 6) so that some Foucault currents are created by induction in the rotor itself and not exclusively in the stator, during the rotation of the rotor, the depth and shape of these recesses being provided so as to set at will the distribution of heating between the stator and the rotor, and Those where the grooves would be rectilinear instead of being curvilinear, and/or inclined toward the front instead of being inclined toward the rear with respect to the direction of rotation of the rotor.

In a general manner, while the above description discloses what are deemed to be practical and efficient embodiments of the present invention, said invention is not limited thereto as there might be changes made in the arrangement, disposition and form of the parts without departing from the principle of the invention as comprehended within the scope of the appended claims.

What I claim is:

1. A Foucault current slowing down device which comprises, in combination,
    a stator comprising a magnetic member having two annular areas, parallel to each other and disposed opposite each other along a common axis,
    said stator further comprising an annular inductor winding housed in said member coaxially with said areas, and
    a rotor disc of a magnetic material journalled in said stator about said axis, having two annular areas, the centers of which are on said axis, said areas being located adjacent and close to said two stator annular areas, respectively,
    at least one of said rotor disc annular areas being provided with a plurality of grooves extending transversely to the circumference of said disc annular area, the depth of said grooves in the direction of said axis being smaller than the thickness of said disc.

2. A Foucault current slowing down device which comprises in combination,
    a stator comprising a magnetic member having two annular areas, parallel to each other and disposed opposite each other along a common axis,
    said stator further comprising an annular inductor winding housed in said member coaxially with said areas and
    a rotor disc of a magnetic material journalled in said stator about said axis, having two annular areas the center of which are on said axis, said areas being located adjacent and close to said two stator annular areas, respectively,
    both of said rotor disc annular areas being provided with a plurality of grooves extending transversely to the circumference of said disc annular area, the depth of said grooves in the direction of said axis being smaller than the thickness of said disc.

3. A Foucault current slowing down device which comprises, in combination,
    a stator comprising a magnetic member having two annular areas, parallel to each other and disposed opposite each other along a common axis,
    said stator further comprising an annular inductor winding housed in said member coaxially with said areas, and
    a rotor disc of a magnetic material journalled in said stator about said axis, having two annular areas the centers of which are on said axis, said areas being located adjacent and close to said two stator annular areas, respectively,
    both of said rotor disc annular areas being provided with a plurality of grooves extending transversely to the circumference of said disc annular area, the depth of said grooves in the direction of said axis being smaller than the thickness of said disc,
    the thickness of the partitions between two consecutive grooves being just sufficient to enable the magnetic flux that has entered the disc axially through the portion of one of its faces extending between two consecutive grooves to be wholly transmitted to the other face of the disc through the material between said two consecutive grooves.

4. A Foucault current slowing down device which comprises, in combination,
    a stator comprising a magnetic member having two annular areas parallel to each other and disposed opposite each other along a common axis,
    said stator further comprising an annular inductor winding housed in said member coaxially with said areas, and
    a rotor disc of a magnetic material journalled in said stator about said axis, having two annular areas the centers of which are on said axis, said areas being located adjacent and close to said two stator annular areas, respectively,
    both of said rotor disc annular areas being provided with a plurality of grooves extending transversely to the circumference of said disc annular area, the depth of said grooves in the direction of said axis being smaller than the thickness of said disc, said grooves being slightly inclined, with respect to the radial directions of the disc, toward the rear with reference to the direction of rotation of the disc.

5. A slowing down device according to claim 4 wherein said grooves are curved toward the rear with reference to the direction of rotation of said disc.

6. A Foucault current slowing down device which comprises, in combination,
    a stator comprising a magnetic member having two annular areas parallel to each other and disposed opposite each other along a common axis,
    said stator further comprising an annular inductor winding housed in said member coaxially with said areas, and
    a rotor disc of a magnetic material journalled in said stator about said axis, having two opposed annular areas the centers of which are on said axis, said areas being located adjacent and close to said two stator annular areas, respectively,
    both of said rotor disc annular areas being provided with a plurality of grooves extending transversely to the circumference of said disc annular area, the depth of said grooves in the direction of said axis being smaller than the thickness of said disc, the sets of grooves being identical on said rotor disc annular areas, respectively, but with an angular offsetting equal to one half of the angular distance between two consecutive grooves of one set, whereby the cylindrical peripheral surface of the disc is zigzag-shaped.

7. A slowing down device according to claim 6 wherein the portion of said magnetic member of the stator located on the outer side of said winding, consists of a plurality of magnetic bridges covering said winding on said outer side thereof, so as to reduce the radial dimensions of the device between said bridges.

8. A slowing down device according to claim 6 wherein the rotor and the stator are provided with recesses such that, during the rotation of the stator, the latter works as a fan compelling a cooling fluid to flow along at least the active areas of the stator.

References Cited

UNITED STATES PATENTS 3,026,431   3/1962   Bessiere   310—93
3,316,429   4/1967   Jaeschke   310—93

ROBERT K. SCHAEFFER, *Primary Examiner.*

H. O. JONES, *Assistant Examiner.*